Oct. 17, 1944.   P. C. ACKERMAN   2,360,461
MOTOR VEHICLE LIGHTING
Filed Oct. 10, 1941.   2 Sheets-Sheet 1
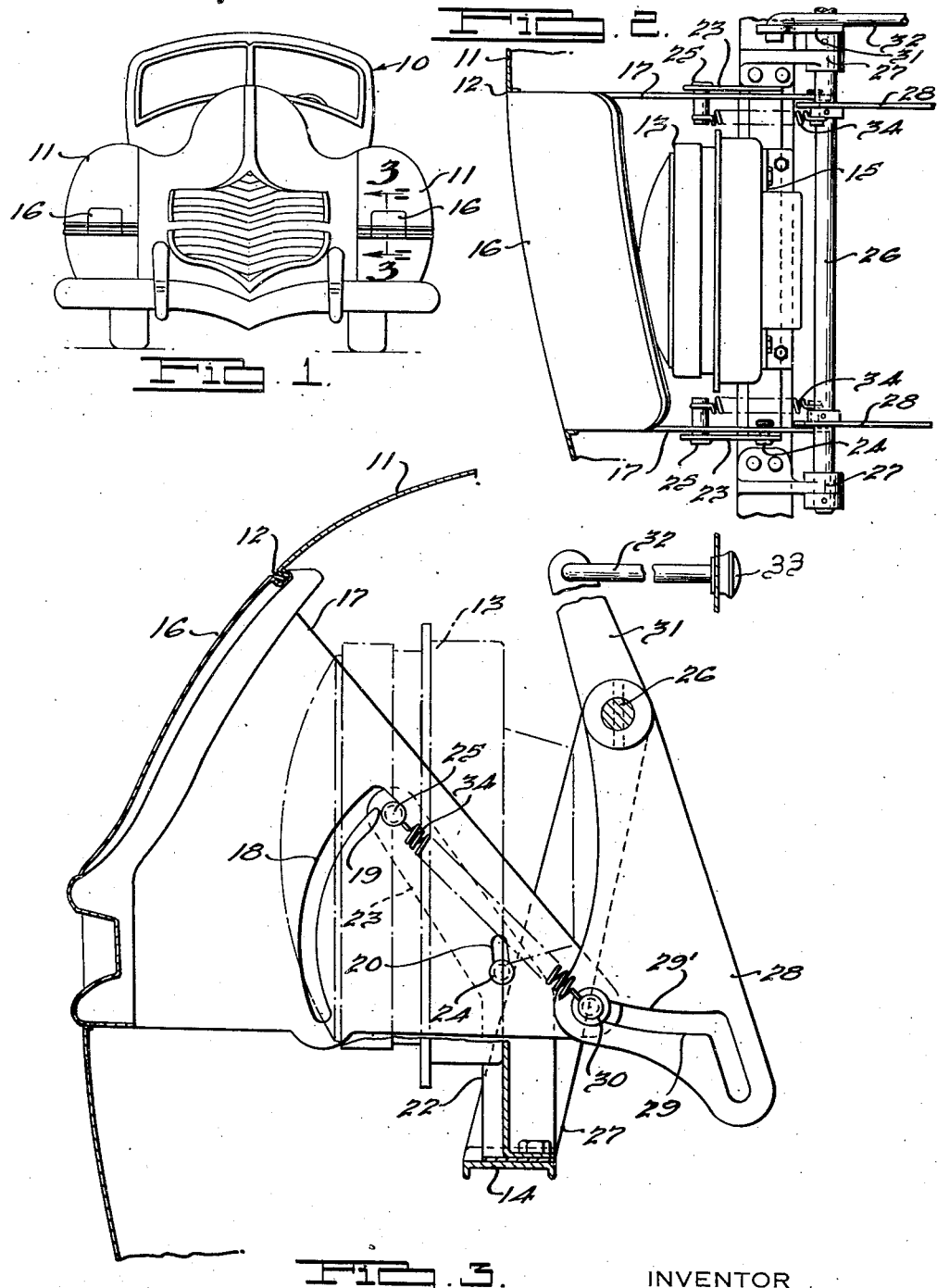
INVENTOR
Paul C. Ackerman.
BY
Harness, Lind, Patter & Harris
ATTORNEYS.

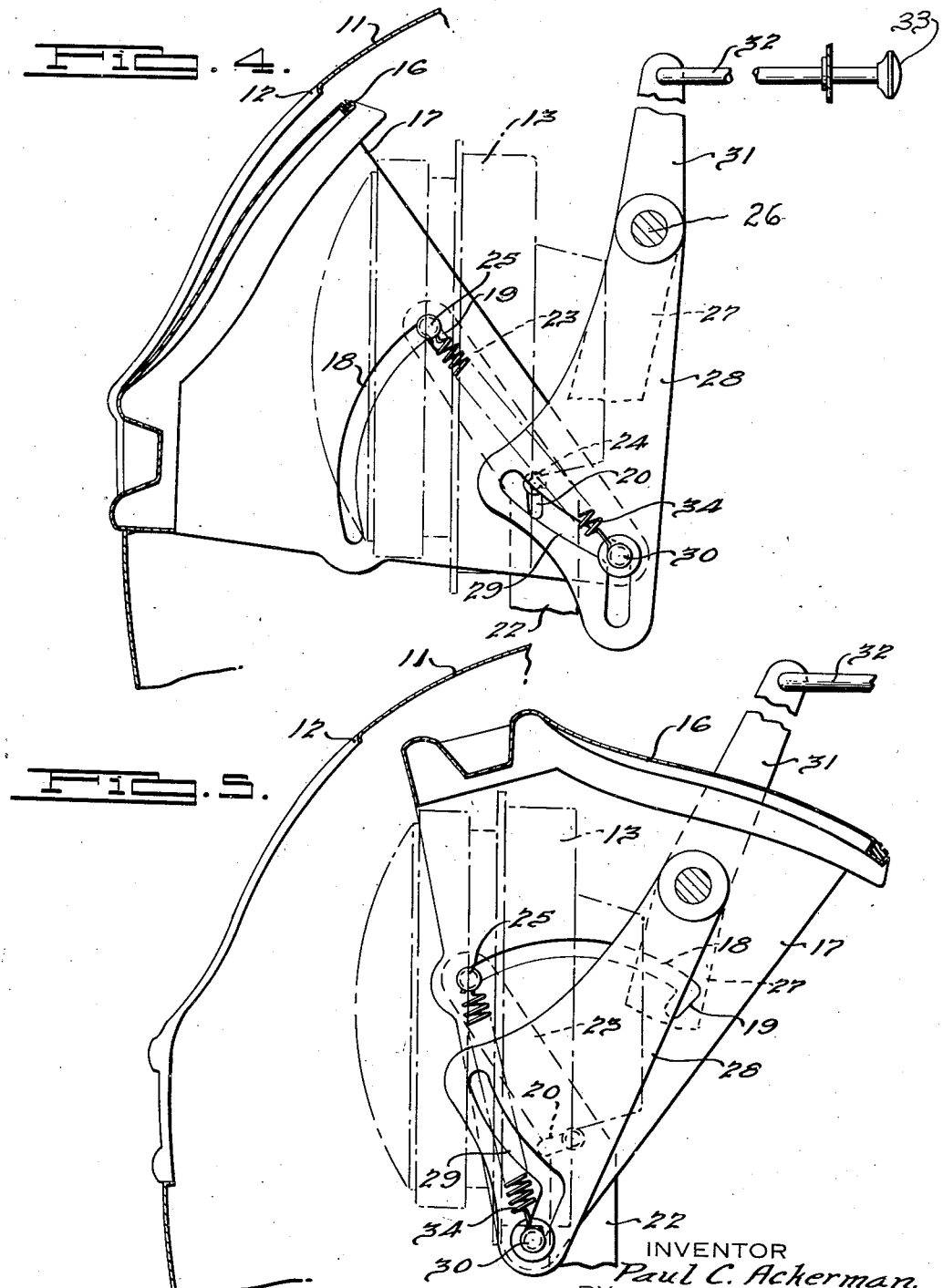

Patented Oct. 17, 1944

2,360,461

UNITED STATES PATENT OFFICE 2,360,461

MOTOR VEHICLE LIGHTING

Paul C. Ackerman, Grosse Pointe, Mich., assignor to Chrysler Corporation, Highland Park, Mich., a corporation of Delaware Application October 10, 1941, Serial No. 414,429

2 Claims. (Cl. 240—7.1)

This invention relates to motor vehicles and more particularly to headlamp structures therefor.

An object of the invention is the provision in a vehicle having a frontal surface provided with laterally spaced openings, behind each of which is mounted a headlamp structure, of a closure for each of said openings mounted in a novel manner for movement to mask and unmask the associated lamp, together with improved operating means for moving the closure as aforesaid.

More particularly an object of the invention is the provision of mounting and actuating means for a closure of the foregoing type which are so arranged as to effect movement of the closures in a main path during one portion of the cycle of operation of the actuating means and to effect movement of at least a portion of the closures generally transversely to said main path during another portion of the cycle of operation of the actuating means, each closure being so disposed with respect to its mounting means as to fulcrum about the latter during movement in said main path.

Other objects and advantages of the invention will be more apparent from the following description taken in connection with the accompanying drawings, in which:

Fig. 1 is a front elevational view of a motor vehicle embodying the invention.

Fig. 2 is an enlarged fragmentary top plan view, partly in section, particularly illustrating a typical closure and the mounting therefor.

Fig. 3 is an enlarged side elevational view, partly in section, taken on line 3—3 of Fig. 1.

Fig. 4 is a view similar to Fig. 3 but illustrating the movable parts in another position.

Fig. 5 is a view similar to Figs. 3 and 4 but showing the movable parts differently positioned.

The invention is illustrated and described in connection with a motor vehicle 10 having front fenders 11 each of which is provided with an opening 12 behind which is disposed a headlamp structure 13 fixedly secured to a support 14 extending transversely of the vehicle by a bracket 15 as shown in Figs. 2 and 3. Each opening 12 is provided with a closure 16 having rearwardly extending side walls 17, each of which has a main arcuately extending slot 18 and a relatively short intersecting slot 19. Each side wall 17 has an elongated opening 20 therein.

Each closure 16 is supported for movement as hereafter set forth by two spaced angularly shaped members disposed adjacent a respective side wall 17, each of these members including a vertically disposed part 22 secured to the support 14 and an upwardly and forwardly extending part 23. A pin 24 fixedly carried by the support part 22 extends through the opening 20 and a similar pin 25 carried by each of the parts 23 is received in one or the other of the slots 18 or 19.

The closures are preferably simultaneously moved to and from the various positions and for this purpose the operating mechanism therefor includes a transversely extending rod 26 journaled in the upper end portion of generally vertically extending supports 27 secured to the transverse support 14. Non-rotatably secured to the rod 26 are four crank arms 28, one of such arms being positioned adjacent each closure side wall 17 and, as illustrated in Fig. 3, being provided with a slot 29 receiving a pin 30 carried by the side wall 17 each slot 29 having a cam-like wall 29'. An arm 31 is non-rotatably secured to the rod 26 and is connected with one end of an operating rod 32 having a knob 33 at the other end thereof preferably disposed adjacent the usual vehicle dash for pull and push operation. An over-center coil spring 34 secured to the pins 25 and 30 acts to maintain the closure in its Fig. 3 and Fig. 5 positions.

In operation, with the parts positioned as shown in Fig. 3, the closures are moved to open or unmasking position by pulling the rod 32 thereby rotating the rod 26 and arms 28 and 31 in a clockwise direction. During the initial portion of this rotation of the arms 28 the walls 29' exert a generally downwardly component of force against the associated pins 30 to shift the closures to a retracted position with respect to the openings 12, as shown in Fig. 4, this movement serving to break any seal which may have been formed, as by ice, between the closure and fender outer surfaces and also providing clearance, where the latter is necessary, to accommodate movement of the closures from the Fig. 3 position to the Fig. 5 position.

When the closures are thus retracted, each slot 18 registers with the associated pin 25 to accommodate subsequent movement of the closures in an arcuate path, the upper wall of each elongated opening 20 engages its pin 24 for fulcruming thereabout, and each pin 30 moves to register with the downwardly extending portion of its slot 29. Continued rotation of arm 28, as aforesaid, swings the closures about their fulcrums provided by the pins 24 in an arcuate path under guidance of the pins 25 and slots 18 to the open or unmasking position illustrated in Fig. 5, during which movement the pins 30 are in their downwardly extending portion of their associated slots 29. To dispose the closures in masking position the rod 32 is pushed to initially swing the closures in the aforesaid arcuate path to the Fig. 4 position, the final portion of swinging movement of the arms 28 exerting an upwardly directed force against the pins 30 to restore the parts to the Fig. 3 position. Movement of the closures between the Fig. 3 and Fig. 4 positions is in a direction generally transverse to the arcuate path in which the closures move between the Fig. 4 and Fig. 5 positions.

Although but one embodiment of the invention is herein shown and described, it will be understood that various changes in the size, shape and arrangement of parts may be made without departing from the spirit of my invention and it is not my intention to limit said invention other than by the terms of the appended claims.

I claim:

1. In a motor vehicle having a frontal surface provided with an opening therein, a lamp disposed rearwardly of the opening, a closure for said opening including a front face and a wall normal thereto and having a first guideway including a main portion and an intersecting auxiliary portion and a second guideway spaced from the first guideway, support means for said closure accommodating movement thereof in a path to mask and unmask the lamp with respect to said opening including relatively fixed first and second elements respectively extending into said first and second guideways, said first element being disposed in said auxiliary portion when said closure is in masking position, said auxiliary portion and said second guideway accommodating movement of said closure from its masking position to a retracted position with respect to said opening whereby said first element registers with the main portion of said first guideway and said closure is positioned to fulcrum about said second element during movement thereof in said path from retracted position as aforesaid to unmasking position with respect to said lamp, the main portion of said first guideway accommodating movement of the closure in said path.

2. In a motor vehicle having a frontal surface provided with an opening, a lamp disposed rearwardly of said opening, a closure including a face substantially closing the opening and completing the frontal surface when the closure is in a first position with respect to the opening, said closure having a wall member disposed rearwardly of said face, a support member for said closure, one of said members having an opening therein, a pin connected with the other of said members extending into said member opening for supporting said closure for movement about an axis contained by said pin from said first position to a second position to uncover the lamp with respect to its opening, said one member including a guideway having a main portion and an auxiliary portion communicating therewith and said other member including a guide element cooperating with said guideway for guiding movement of said closure as aforesaid and disposed in said auxiliary portion when the closure is in its said first position, said member opening being so elongated with respect to said pin as to accommodate movement of said one member relative to said other member in a direction transverse to said axis and movement of said guide element from said auxiliary portion to said main portion as the closure is initially moved from its said first position to thereby retract said face relative to the frontal surface opening, said guide element moving in said main portion during movement of said closure when so retracted to its said second position.

PAUL C. ACKERMAN.